Dec. 25, 1928.
C. A. VAN BOURGONIE
1,696,741
ELASTIC WHEEL
Filed Sept. 2, 1925
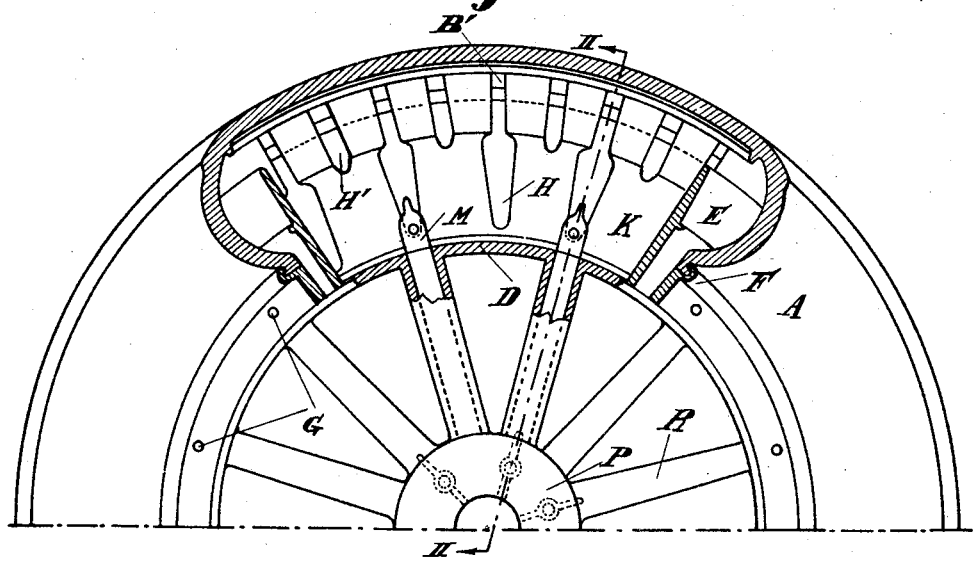
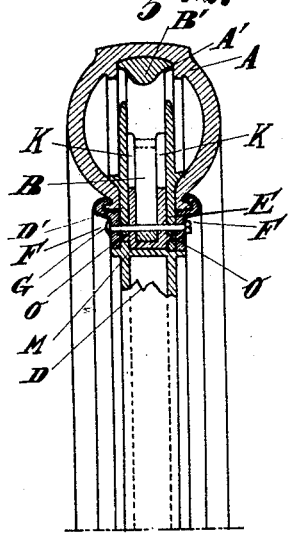

Patented Dec. 25, 1928.

1,696,741

UNITED STATES PATENT OFFICE.

CONSTANT ADRIEN VAN BOURGONIE, OF BERGERHOUT-ANTWERP, BELGIUM.

ELASTIC WHEEL.

Application filed September 2, 1925, Serial No. 54,109, and in Belgium September 18, 1924.

The present invention relates to an elastic wheel particularly intended to replace the ordinary tyres of motor-cars.

The improved elastic wheel according to the invention is characterized by the fact that use is made of the ordinary wheel-element and of tyre covers or outer covers of the usual type except for the fact that their inner shape is somewhat modified.

The object of the invention is to provide an elastic wheel which is not liable to material damage which may have as a consequence the deflation or loosening of the tyre with the serious consequences with which this may be followed for the vehicle. With ordinary air inflated tyres this danger exists permanently, as the inner or air chamber is not sufficiently protected by the outer cover. In the improved wheel according to the invention use is made of elastic elements which take up all impacts in a radial direction and these elastic elements are protected and guided by fixed rigid members; these rigid members which may be readily moved and placed in position, simultaneously serve in cooperation with the flanges of the rim of the wheel to secure the outer cover, and as they are entirely covered over, the improved elastic wheel seen from the outside, still has the same appearance as that of an ordinary wheel.

In order that the invention may be readily understood, an embodiment of same will be described by way of example, illustrated by the accompanying drawing, wherein:

Fig. 1 is an elevation of a wheel according to the invention, some parts being broken away in order better to show the inner arrangement, and Fig. 2 is a radial section taken on the line II—II of Figure 1.

Referring to these figures, the wheel illustrated comprises an ordinary wheel structure with a hub P, spokes R and a rim D. This rim D is formed with an integral lateral flange D' which in radial section is at right angles to the rim D, i. e. in a plane perpendicular to the periphery of the rim. This annular lateral flange D' forms together with a similar but removable annular lateral flange E parallel to the flange D', the guiding members for the elastic element of the wheel. This elastic element consists of an elastic ring of suitable size and diameter which is located between the two flanges or guiding members D' and E. This elastic element, indicated at B on the drawing, cooperates with an outer cover A of the usual type having its edges or fillets clamped between the respective flanges D' and E and the edge portions or flanges F of the rim D. The elastic element is chosen with a view to enable the same to take up all impacts radially, and for this purpose, the elastic element B is on the one hand guided by the flanges D' and E, while on the other hand it engages in a circumferential groove A' formed in the thickened portion and in the inner periphery of the outer cover A. The said outer cover thus has to be formed either with a depression in its inner peripheral surface or with parallel circumferential ribs or fillets on its inner periphery in order to obtain the groove A'. The guiding members D' and E thus attain a determined depth within the outer cover A and in order to prevent the lateral pressure on the outer cover A from pushing the elastic element B out of the radial direction, this element B is constructed in such a way that it is capable of yielding in a radial but not in a lateral direction. The elastic element B may be freely placed between the flanges D' and E, but it is preferable to keep the said element in its place by means of bolts G which simultaneously serve to secure the rim flanges F against the flanges D' and E adjacent the rim D of the wheel. As may be seen, the edges or fillets of the outer cover A are firmly held between the parts F and D'—E, so that the elastic element is protected against dirt or damage. Radial grooves H and H' are cut at intervals across the whole thickness of the elastic element B, and the latter is formed on each side with an annular hollowed out portion K adjacent its inner periphery. The grooves H have a depth almost equal to the whole depth of the element B, the remaining portion B' constituting the connection between the rubber blocks separated by the said grooves. The intermediate grooves H' are of lesser depth than that of the grooves H. Small metal U-pieces M provided at intervals corresponding to the grooves H and which are placed on the rim D and engage at the sides with the inner periphery of the elastic element B, serve to hold the latter in firm position when the bolts G passing through the said U-pieces have been screwed tight. A pin O provided laterally on each side of each of the U-pieces M and engaging in a hole in the respective flange D' or E prevents the said U-pieces from becoming displaced.

I claim:

In an elastic wheel, the combination with a wheel frame including a hub, spokes and a rim, of a solid rubber annular elastic element formed on each side with an annular hollowed out portion adjacent its inner periphery and having a series of grooves cut radially across same, said grooves having alternately a depth nearly equal to the whole depth of the elastic element, and a lesser depth; two rigid flange-like annular lateral guiding members secured to the edges of the rim and on either side respectively of the said elastic element; metal U-pieces placed on the rim of the wheel and engaging at the sides with the inner periphery of the elastic element at intervals corresponding to the deeper grooves of the latter, said U-pieces each having at each side a lateral pin engaging in a recess of the flange-like guiding members; an outer cover placed over the elastic element and said guiding members, the said outer cover having a circumferential groove formed in its inner periphery to receive and engage with the outer peripheral portion of the elastic element; and detachable means for securing the circumferential edge portions of the said outer cover against the outer faces of such guiding members adjacent the rim of the wheel.

In testimony whereof I signed hereunto my name.

C. VAN BOURGONIE.